Patented July 17, 1923.

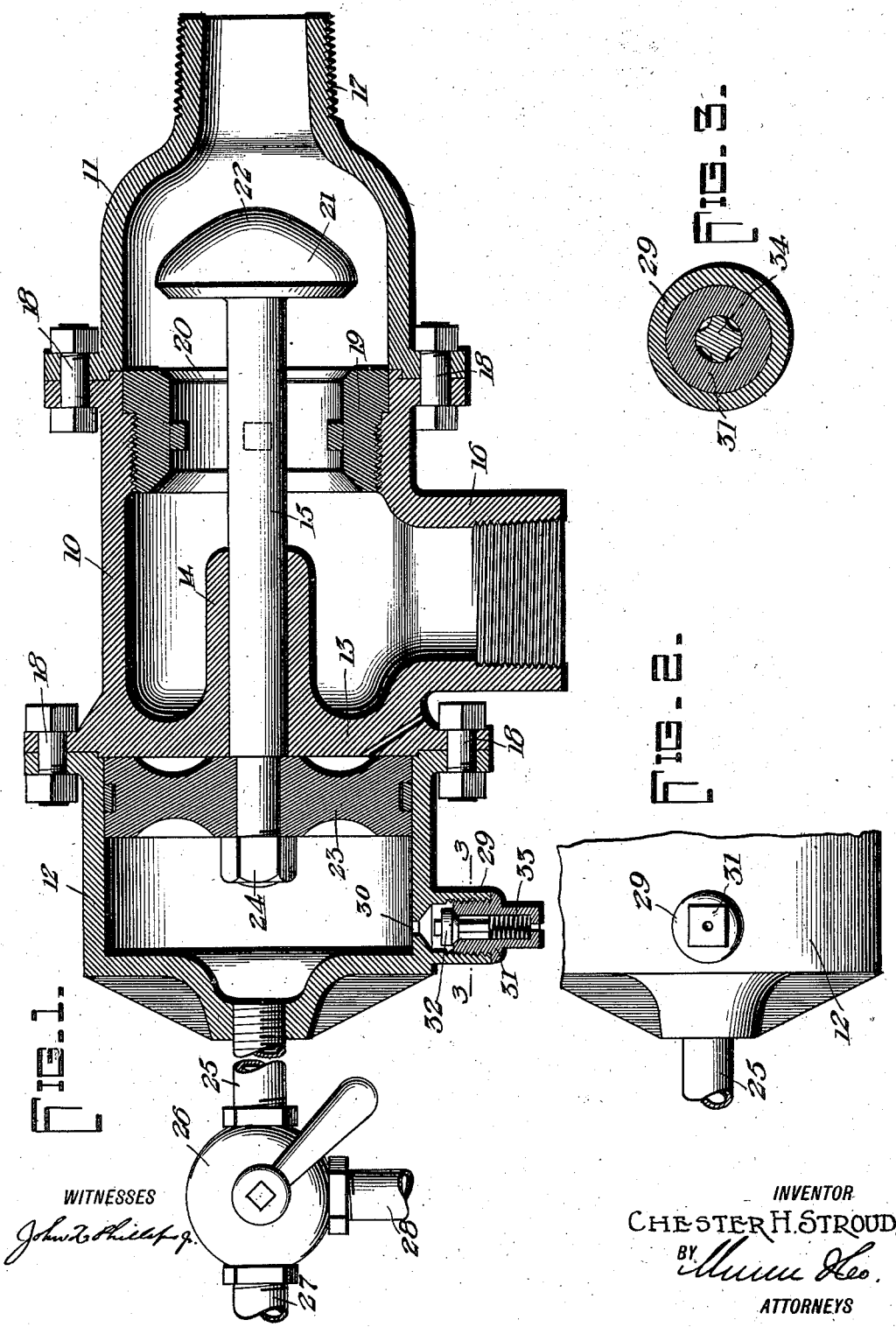

1,461,835

UNITED STATES PATENT OFFICE.

CHESTER H. STROUD, OF HUBBELL, MICHIGAN, ASSIGNOR OF ONE-HALF TO NEIL M. GILLIES, OF LAKE LINDEN, MICHIGAN; MARTIN YAUCH ADMINISTRATOR OF SAID CHESTER H. STROUD, DECEASED.

SELF-CONTAINED BLOW-OFF VALVE.

Application filed March 29, 1919. Serial No. 286,012.

*To all whom it may concern:*

Be it known that I, CHESTER H. STROUD, a citizen of the United States, and a resident of Hubbell, in the county of Houghton and State of Michigan, have invented certain new and useful Improvements in Self-Contained Blow-Off Valves, of which the following is a specification.

My present invention relates generally to valves and more particularly to blow-off valves, my object being the provision of a self-contained valve, the moving parts of which will be fully concealed, and the construction of which will provide for many advantages as hereinafter pointed out.

In reference to the accompanying drawings which illustrate my invention and form a part of this specification, Figure 1 is a longitudinal section through my improved valve, Figure 2 is a partial bottom plan view, and Figure 3 is a detail section taken substantially on line 3—3 of Figure 1.

Referring now to these figures, my invention proposes a valve of the present type, the casing of which is in three sections 10, 11 and 12, the intermediate section 10 being open and internally threaded at its forward end and being closed at its rear end as seen at 13, said rear closed end having an elongated axial bearing 14 for the valve stem 15. This intermediate section is also provided with a laterally projecting outlet nipple 16, internally threaded to form connection with any suitable discharge pipe.

At its forward end the forward section 11 has a reduced externally threaded boiler engaging end 17, the opposite end of the forward section 11, as well as the inner end of the rear section 12, and the two ends of the intermediate section 10 having apertured annular abutting flanges through the apertures of which clamping bolts 18 are extended so that the intermediate section 10 may thus be connected in rotatably adjustable relation between the forward and rear sections in order that its lateral nipple 16 may be extended in any particular or desired direction to accord with the discharge pipe to which it is secured.

Into the forward open end of the intermediate section 10 is screwed a ring 19 which carries the valve piece 20 for the valve 21 at the forward end of the stem 15, said valve 21 being provided with an enlarged knob-like end, as seen at 22 and being of a diameter such as to leave a space between the same and the inner surface of the front section which is less than the space between the valve and its seat, when the valve is opened. In this way it becomes assured that any pieces or sections of scale capable of passing between the valve 21 and the inner surface of the front section 11 will have free passage between the valve and its seat 20.

It will be noted moreover, that the reduced front portion 17 of the front section 11 is so spaced from the valve seat 20 that the valve in its forward opening movement will engage and crush any sections or pieces of scale incapable of passage between the valve and the inner surface of the front section 11 of the casing around the valve.

At the rear end of the valve stem 15, and rearwardly beyond the rear closed end 13 of the intermediate section 10 of the casing, is secured a piston 23 this piston being held upon a reduced rear extension of the stem 15 by means of a nut 24, and being located within a piston cylinder formed within the rear section 12 of the casing, to the rear end of the latter of which a supply tank 25 connects. This pipe 25 leads from a threeway valve 26 and to this valve are connected pipes 27 and 28 respectively leading to the atmosphere and to the boiler or air reservoir.

At its lower portion, the rear section 12 of the casing is provided with an internally threaded nipple 29, with which it communicates through a drain opening 30 and within this nipple 29 is screwed a valve cage 31 in which a drain valve 32 operates and is normally held off of its seat by means of a spring 33. This valve 32 in its movement onto its seat, shifts away from the piston chamber of the rear casing section 12 so that when with the threeway valve 26 in position to communicate between the pipes 28 and 25 and either steam or compressed air thus allowed to pass into the piston cylinder or chamber, the pressure forces drain valve 32 onto its seat against the tension of its spring 33 and the same pressure shifts the piston 32 forwardly, carrying with it the stem 15 and the valve 21 so as to move the latter away from its seat 20 and provide for free communication between the forward end of the front section 11 of the casing and the lateral outlet nipple 16 of the intermediate section 10. When in the action of these parts the required blow off has been accomplished, the threeway valve 26 is shifted to communicate between the pipes 27 and 25, thus instantly relieving pressure within the piston cylinder to the atmosphere through the pipe 27, and permitting the boiler or air reservoir pressure to act against the valve 21 for the purpose of seating the same upon its seat 20. During this movement of the valve onto its seat, the piston 23 is of course shifted rearwardly in the rear section 12 of the casing, and instantly upon the release of pressure within the rear section of the casing, valve 32 opens under the pressure of its spring 33 so that in the case of steam particularly, any water of condensation will be allowed to drain to the exterior through the valve cage 32, around the grooved stem 34 of the valve 32, which grooved stem is particularly seen in Figure 3.

In the practical utilization of my improved valve, the front section 11 is first properly screwed tightly in connection with either the boiler or compressed air reservoir with which it is to operate, and the intermediate section 10 is then connected to the front section 11 so as to bring its outlet nipple 16 into the proper direction for connection with the discharge pipe. When this is done, the rear section 12 is then connected to the intermediate section 10 in such a way as to bring its drain valve in lowermost position and the valve is then complete and ready for operation when the threeway operating connections have been made to the rear section 12.

It is obvious that to bring about proper relative adjustment of the intermediate section 10 and the rear section 12 with respect to one another and with respect to the front section 11, some rotatably adjustable form of connection, such as proposed by my invention, is required, and this requirement is, it is equally clear to be seen, met in the provision of the annular flanges which abut one another between these sections, connected by the clamping bolt 18, and providing for the use of ground joints to avoid the necessity for gaskets and the like.

It is equally obvious from the foregoing that my invention provides a blow-off valve in which the moving parts are entirely concealed and movable within the limits of the casing, and are protected from outside influences, as well as from accidental blows, either likely to cause breaking thereof or distortion of the movable parts to the extent of creating undue or undesirable friction.

I claim:—

1. A blow-off valve having a casing provided with an internal valve seat, a piston controlled valve movable entirely within said casing to and from said seat and having an enlarged rounded head, said casing including a forward portion around the valve having a reduced extension and from the wall of which the valve is spaced a distance less than the space between the valve and the seat when the valve is fully opened.

2. A blow-off valve having a casing provided with an internal valve seat, a piston controlled valve movable entirely within said casing to and from said seat and having a solid rounded crushing head, said casing including a forward portion around the valve having a reduced front end provided with a smooth inner surface to co-operate as a crushing abutment with the valve head and from which the valve in fully opened position is spaced a distance less than that between the valve and its seat.

3. A blow-off valve having a casing provided with an internal valve seat and a portion forwardly of the valve seat provided with a reduced extension coaxial with the seat, forming a curved inclined annular shoulder internally of the casing and spaced from the seat, and a valve movable in the casing to and from said seat, having a solid rounded crushing head whose diameter is greater than the internal diameter of the said casing extension to co-operate with the inner surface of said forward portion of the casing and the said shoulder and spaced from the latter, in the open position, a distance less than the space between the valve and its seat.

CHESTER H. STROUD.